June 29, 1965   R. C. SYMONS   3,191,709
ARTICULATED VEHICLE
Filed Jan. 18, 1962   7 Sheets-Sheet 3

INVENTOR
ROBERT C. SYMONS
BY
RICHEY, McNENNY & FARRINGTON
Donald W. Farrington
ATTORNEYS

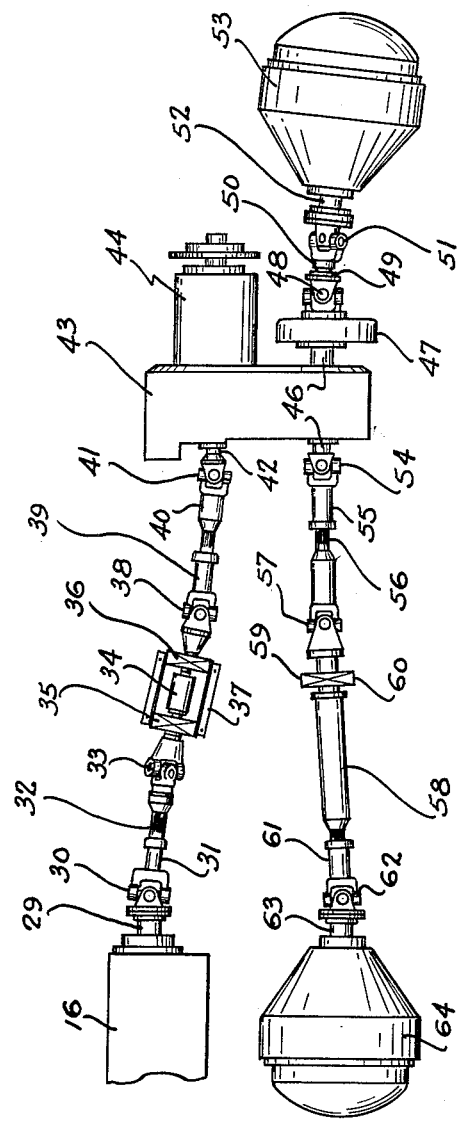

June 29, 1965  R. C. SYMONS  3,191,709
ARTICULATED VEHICLE
Filed Jan. 18, 1962  7 Sheets-Sheet 5
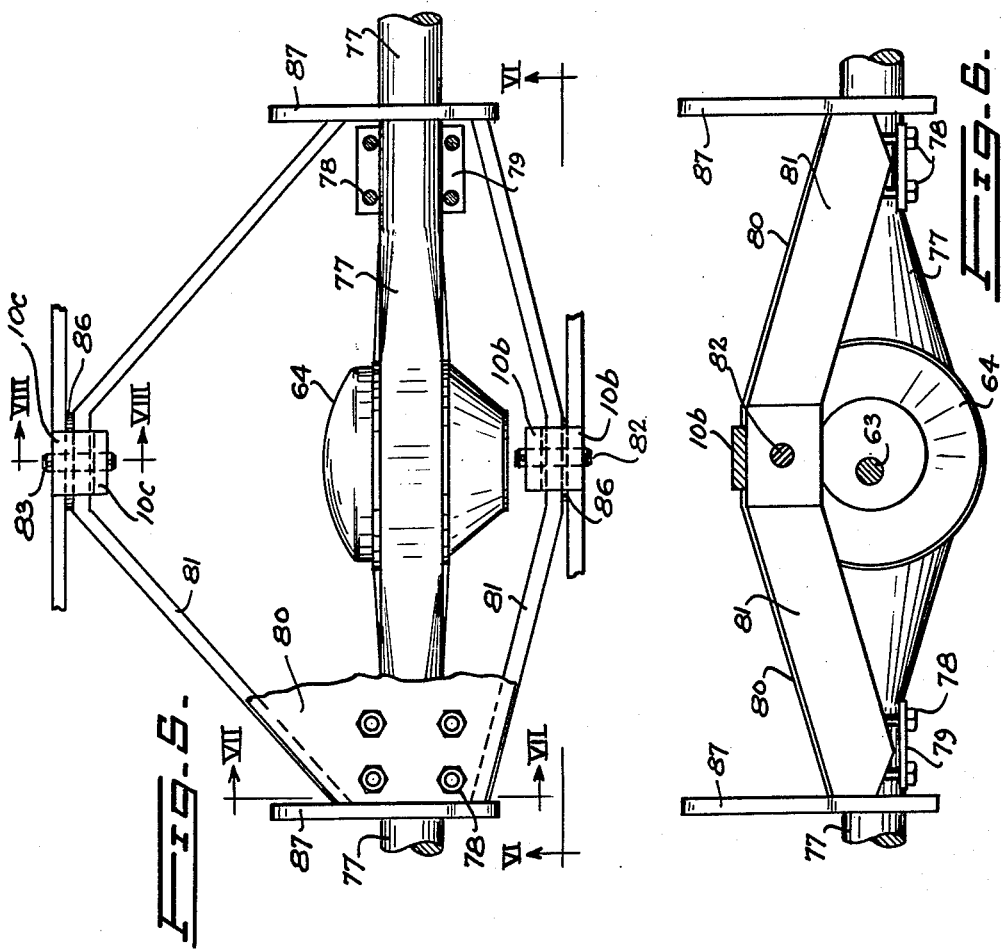
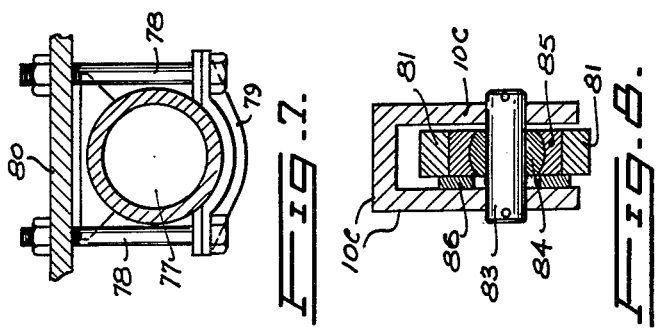
INVENTOR.
ROBERT C. SYMONS
BY
RICHEY, McNENNY & FARRINGTON
ATTORNEYS June 29, 1965    R. C. SYMONS    3,191,709
ARTICULATED VEHICLE
Filed Jan. 18, 1962    7 Sheets-Sheet 6
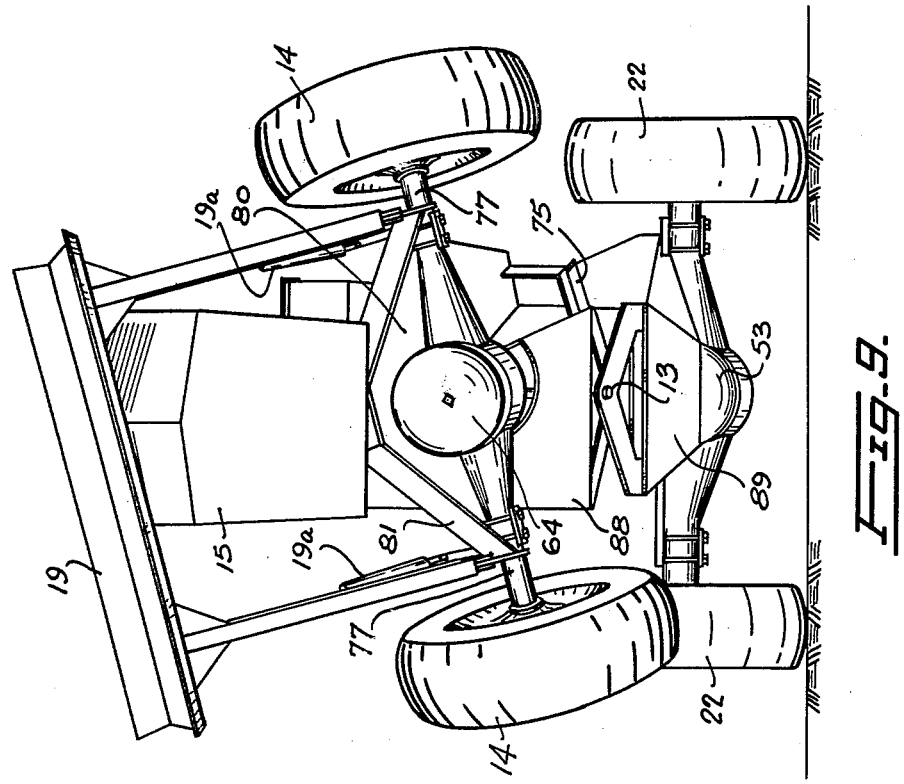
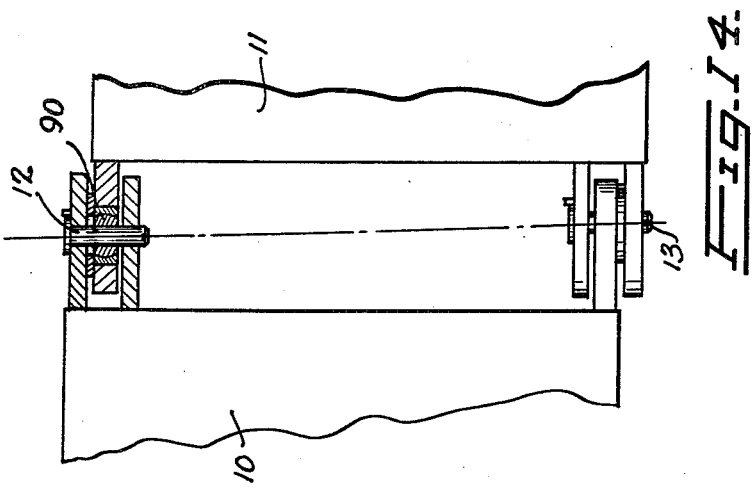
INVENTOR.
ROBERT C. SYMONS
BY
RICHEY, McNENNY & FARRINGTON
ATTORNEYS

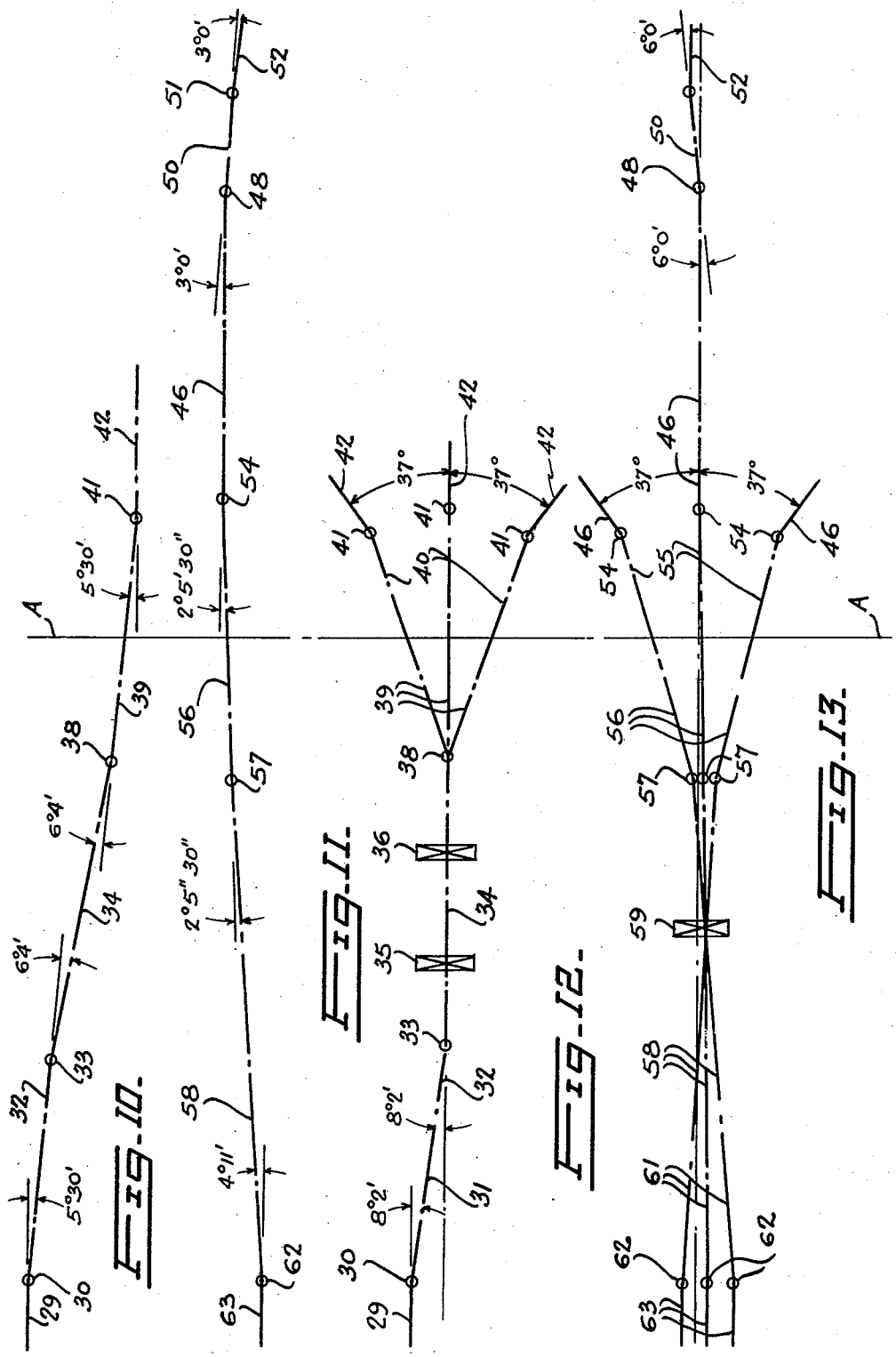

United States Patent Office 3,191,709
Patented June 29, 1965

3,191,709
ARTICULATED VEHICLE
Robert C. Symons, Woodstock, Ontario, Canada, assignor to Timberland-Ellicott Limited, Woodstock, Ontario, Canada
Filed Jan. 18, 1962, Ser. No. 167,029
Claims priority, application Canada, Dec. 4, 1961, 837,387
5 Claims. (Cl. 180—51)

This invention relates to improvements in the construction of articulated-type vehicles, that is to say vehicles formed of two frames each mounted on a respective pair of road wheels, the two frames being pivotally connected together for the purposes of steering the vehicle.

The various objects of the invention include the provision of improvements in vehicles of this type in respect of improved function and utility, greater ease of handling, and higher reliability in day-to-day operation especially over rugged and difficult terrain.

The more specific objects and the various features of the invention will appear fully from the description that follows. This description, which should be read in the light of the accompanying drawings, is intended to provide merely an example of the present invention and is not intended to restrict the scope thereof, which latter is defined by the appended claims.

In the drawings:

FIGURE 4 shows the power transmission system in side elevation;

FIGURE 5 is a plan view of a tilting beam portion of the forward frame of the vehicle with the upper plate partly cut away to reveal the parts beneath;

FIGURE 6 is a view on the line VI—VI in FIGURE 5;

FIGURE 7 is a section on the line VII—VII of FIGURE 5;

FIGURE 8 is a section on the line VIII—VIII of FIGURE 5;

FIGURE 9 is an underside, rearward-looking, perspective view of the vehicle demonstrating the manner of tilting of the beam of FIGURES 5 and 6;

FIGURE 10 is a line diagram in side view of the upper drive shaft arrangement of FIGURE 4;

FIGURE 11 is a line diagram in side view of the lower drive shaft arrangement of FIGURE 4;

FIGURE 12 is a line diagram in plan view of the upper drive shaft arrangement of FIGURE 4;

FIGURE 13 is a line diagram in plan view of the left hand part of the lower drive shaft arrangement of FIGURE 4; and FIGURE 14 is a fragmentary view of the centre of the vehicle.

Figure 1:
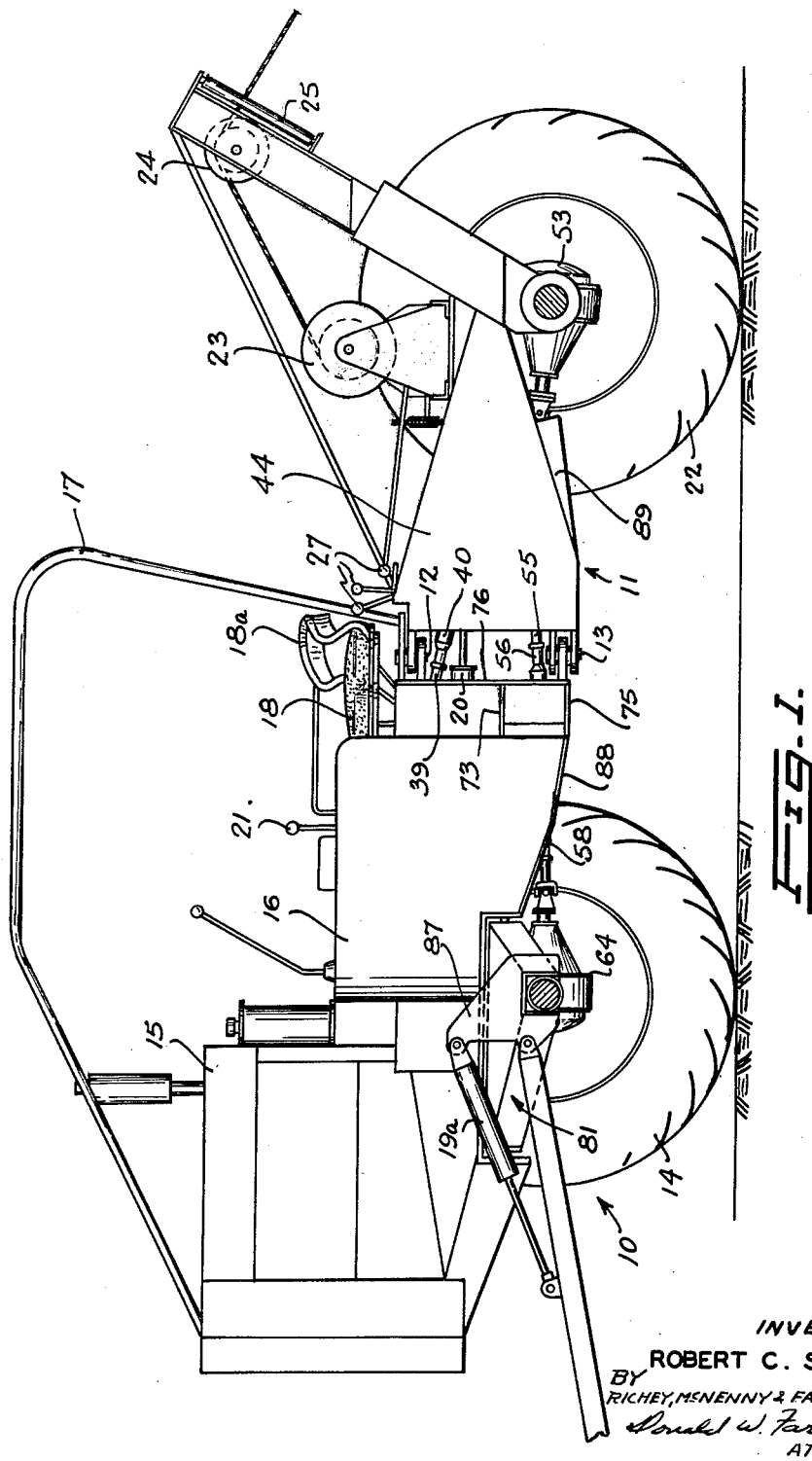
FIGURE 1 is a side view, partly cut away, of a vehicle embodying the invention.

The vehicle comprises two main frames, a forward frame 10 and a rear frame 11 interconnected by means of a pair of coaxial pins 12 and 13 defining a generally vertical axis of articulation situated approximately in the centre of the vehicle.

The forward frame 10 is mounted on a pair of road wheels 14 and supports a power plant 15, gear box 16, canopy frame 17, driver's seat 18, vertically movable blade 19, a double-acting hydraulic steering cylinder 20, hydraulic controls 21 for operating hydraulic cylinders 19a of the blade 19 and the steering cylinder 20, and other frame, bearing and transmission components that will be more fully described below. Steering cylinder 20 is pivotally secured to the front frame 10, while its piston rod is connected by a pin 28 to the rear frame 11, its line of action being off-set from the axis of articulation to enable it to perform a steering function.

The rear frame 11 is mounted on a pair of road wheels 22 and supports a winch 23, cable sheave 24 with associated rollers 25, gear box 44, winch controls 27 and other subsidiary parts.

As best seen in FIGURE 4 transmission of power takes place from power plant 15 through gear box 16, output shaft 29, universal joint 30, a pair of splined telescoping shafts 31 and 32, a universal joint 33 and a shaft 34 supported at each end in bearings 35 and 36 mounted in a pillow block 37 secured to the forward frame 10. Shaft 34 drives through a universal joint 38, a pair of splined telescoping shafts 39 and 40, a universal joint 41 and a shaft 42 into a transfer mechanism 43.

The transfer mechanism 43 houses an assembly of gearing that provides a speed reduction for a drive through the further gear box 44 and a chain drive 45 to the winch 23. Transfer mechanism 43 also extends downwardly to an output shaft 46 that extends rearwardly through a brake assembly 47, universal joint 48, a pair of splined telescoping shafts 49 and 50, and another universal joint 51 to the input shaft 52 of a rear differential 53 from which power is transmitted to the wheels in the usual way. Forwardly of the transfer mechanism the output shaft 46 drives into a universal joint 54 and through a pair of splined telescoping shafts 55 and 56 and a universal joint 57 to a shaft 58 that is supported by a self-aligning bearing 59 mounted in a pillow block 60 secured to the forward frame 10. Shaft 58 makes a splined telescoping pair with a shaft 61 that drives through a universal joint 62 to the input shaft 63 of a forward differential 64 from which power is transferred to the wheels in the usual way.

Figure 3:
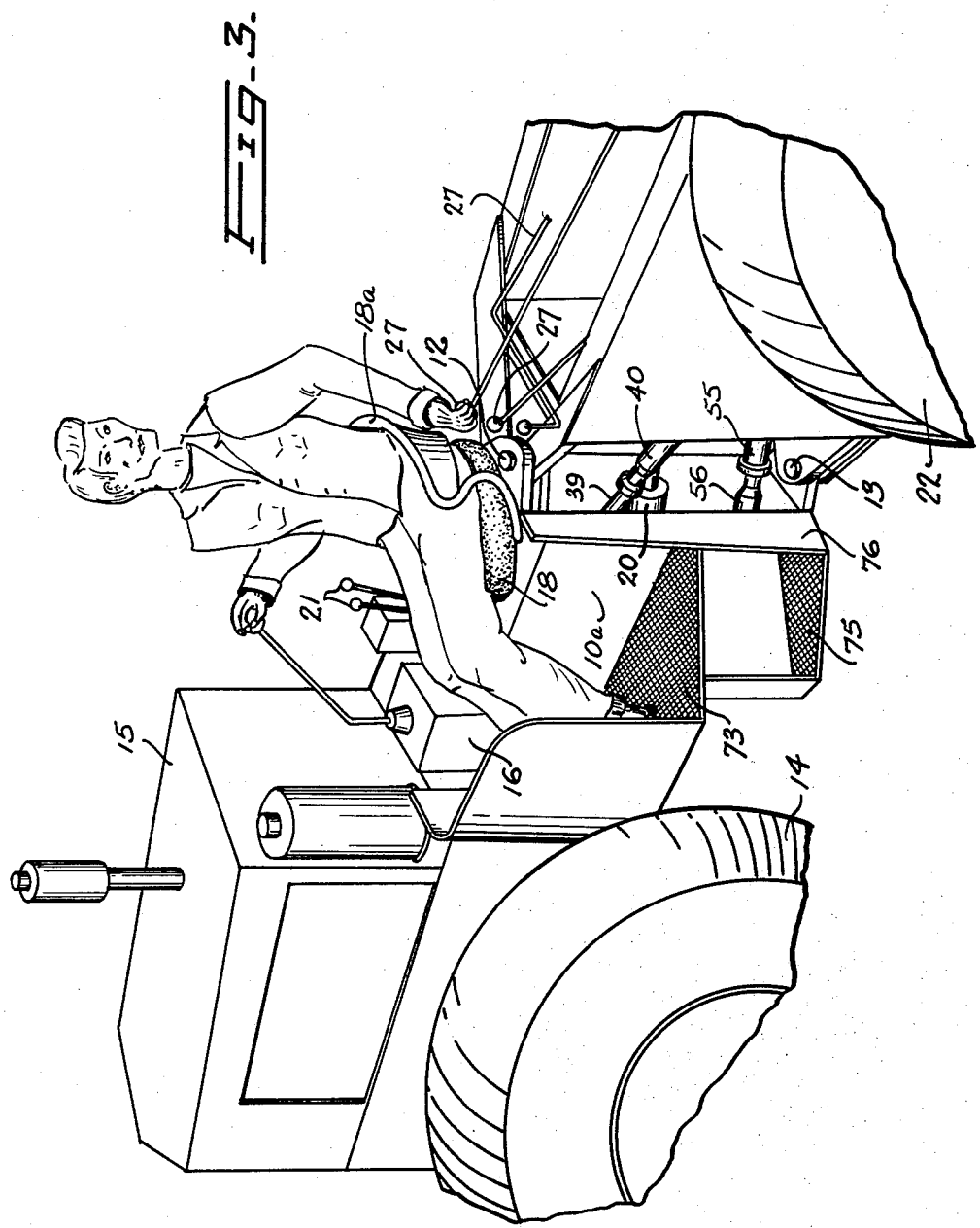
FIGURE 3 is a fragmentary perspective view of the central section of the vehicle demonstrating its manner of operation.

The arrangement of the driver's seat 18 is of particular significance. This seat is fixed in position on the forward frame 10 approximately over the axis of articulation, but facing at an angle of about 25° to the front to rear axis of the front frame (as defined by the wheels 14). The direction in which the seat faces is defined by its back rest 18a. By this arrangement, it is possible to place the seat approximately on the centre-line of the vehicle, thus permitting the driver to observe fully both sides of the vehicle, while at the same time providing sufficient space for him to place both his legs comfortably on the same side of the casing 10a which forms part of the frame 10 and covers the transmission and steering components (see especially FIGURE 3). The driver's feet rest on a foot plate 73 within easy reach of pedal controls 74. A step 75 is provided for ascending to the driving position. A guard 76 checks any tendency for the driver's legs or feet to move rearwardly and come into contact with the moving drive shafts or other parts.

In operating a vehicle of this type, the driver is called upon to mount and dismount very frequently, since his duties include the hitching and unhitching of logs to and from the winch cable. Prior forms of tractor-type vehicles have suffered the disadvantage that, either the seat is positioned very high up on the vehicle with the driver's feet at an elevation higher than the drive shafts, or the driver has had to sit with his legs straddling the shaft casing, both of which arrangements are uneconomical of time and effort when mounting and dismounting. In the former case the driver has a long way to climb up; in the latter case he has an awkward position to acquire. The present arrangement avoids both these difficulties, since the driver sits low down with both legs on one side of the shaft casing 10a. At the same time it affords a further advantage. When the driver has to look around at logs being hauled in by the winch, as he often has to do, he is able to look directly rearwardly by turning his head and shoulders through an angle less than 180°, as FIGURE 3 demonstrates. It is a great deal easier for a seated person to twist his body sufficiently to direct his eyes comfortably at an angle of about 150° to 160° to the line on which he is sitting, than it is for him to bring his line of sight around for the full 180° turn.

Thus the present seat arrangement, while avoiding the constructional complexity and operational disadvantages of a swivel seat, facilitates the driver looking rearwardly of the vehicle. It also minimises time and effort expended in mounting and dismounting, although not at any expense as far as vehicle clearances are concerned. The present arrangement does not require lowering of the drive shafts as the driver's legs are to one side of the shaft casing. Although the driver's feet are at a comparatively low elevation on the foot plate 73, they are not exposed to danger from rocks or logs that might penetrate the steel, as they are elevated from the clearance level defined by the wheel axles, the step 75 and the underside plates later to be described. Sometimes the wheel axles are the lowest parts, sometimes the underside plates and step 75 are, this variation being due to twisting of the axles about a horizontal front to rear axis as the vehicle passes over uneven ground, as will be further explained below. In any event, the driver's feet are situated above the clearance level by only a comparatively small amount, and yet this amount represents a safety factor, while seating the driver at the lowest level that can be achieved. Comfortable seating of the driver at this low level has been achieved in the present construction with no attendant disadvantages, and indeed with some advantage, as already explained.

Figure 2:
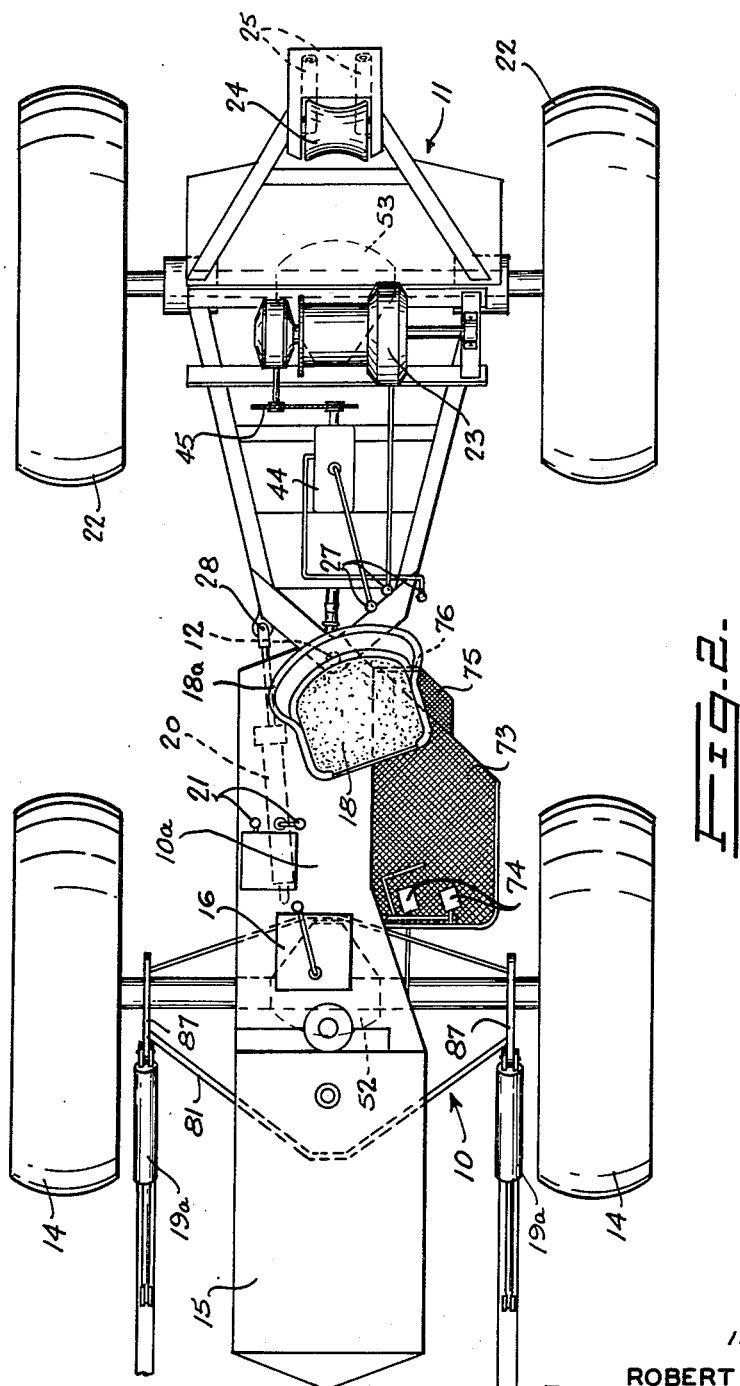
FIGURE 2 is a plan view of FIGURE 1, again with some structural members omitted for clarity.

Another feature of the present construction, to which special attention is drawn, is the manner of mounting the front axle assembly. FIGURE 5 shows a plan view on a larger scale than FIGURE 2 of a fragment of FIGURE 2, namely the front axle assembly and its associate parts of the forward frame 10. Reference should also be made to FIGURES 6 to 8. The axle housing 77 extending on each side of the differential 64 is secured by bolts 78 and yokes 79 to a plate 80 which forms part of a rigid framework or beam 81. In this way the beam 81 is made to support rigidly the axle assembly, such beam serving to mount the axle assembly for pivotal motion about a front to rear horizontal axis extending generally parallel to and above the axis of the input shaft 63. The pivotal mounting of the beam 81 is achieved by a pair of pins 82 and 83 which pass through members 10b and 10c of the forward frame 10. FIGURE 8 illustrates in section the mounting of the forward such pin 83 and shows how a part-spherical self-aligning bushing 84 secured to the pin 83 is free to turn about any axis in a complementarily shaped housing 85 mounted on the beam 81. A thrust washer 86 lies between beam 81 and the forward portion of the frame member 10c. The arrangement at the rear pin 82 is similar (so that no separate sectional illustration has been provided), except that here the thrust washer 86 lies between the beam 81 and the rear portion of the frame member 10b. The beam 81 is of unusual construction in that it is positioned above the axle assembly rather than below it. By so mounting the beam above the axle assembly, no loss of clearance is permitted.

The underside, perspective, rearward-looking view of FIGURE 9 demonstrates how the front axle assembly may thus be tilted by the pivoting beam 81 to accommodate uneven terrain. The blade 19 pivots with the axle assembly and beam 81 by virtue of its being mounted on plates 87 which project up from the two sides of the beam. The shape of these plates is best seen in FIGURE 1. FIGURE 9 also illustrates an underside plate 88 fixed to the forward frame 10 rearwardly of the beam 81, and an underside plate 89 fixed to the rear frame 11. These plates, which protect the drive shafts from damage on rough terrain, are provided on the underside of the vehicle without sacrificing adequate clearance. This is possible because of the particular arrangement of drive shafts developed in the present construction in which the transfer mechanism 43 is mounted at a comparatively high level, while still effecting transfer of power downwardly to the differentials.

The manner in which this result is achieved while avoiding the problems introduced by the arrangement of the pivotal axis of the front axle assembly along a line displaced from the axis of the shaft 63, will become clearer from a consideration of FIGURES 10 to 13 which consist respectively of single line diagrams showing side and plan views of the top and bottom shaft assemblies. The angles through which the drive is turned are shown on all these diagrams, and the plan views (FIGURES 12 and 13) show the range of travel of the shafts 39, 40 and 55, 56 that cross the axis of articulation A between steering extremes. The plan view of the bottom shaft (FIGURE 13) also demonstrates the arcuate range of movement of universal joint 62 and consequently of universal joint 57 that results from pivoting of the front axle assembly with beam 81.

The angles that the various shafts make with each other have been shown on the drawing as examples only, to serve the purpose of demonstrating that they are larger than is conventional when normal universal joints are employed, and to illustrate the fact that, by employing the particular arrangement shown, it has become possible to transmit the necessary power to the differentials through comparatively sharply inclined shafts, thus permitting the transfer mechanism 43 to be mounted at a relatively high position on the rear frame 11 with the advantages in respect of clearance mentioned above.

It must be appreciated that the effective clearance is not necessarily determined by imagining a horizontal plane touching the lowest-most points at front and rear (normally the bottoms of the differential housings). Since the vehicle will often encounter rough terrain in which the two pairs of wheels will straddle a ridge of high ground, it is important to have the maximum possible clearance in the central part of the vehicle, that is in the vicinity of the axis of articulation. It is not enough for this central clearance merely to be equal to the end clearances; desirably, the central clearance when the vehicle is on flat ground should be greater than the end clearances, in order to provide for travel over sharply uneven ground. This desirable object has been achieved in the present vehicle, while at the same time the drive shafts are protected against direct contact with rocks, tree stumps and the like by the underside plates 88 and 89.

An important aspect of the drive shaft arrangement is the phasing of the universal joints, which is shown in FIGURE 4, that is to say the relative angular positions of the universal joints to one another. This relationship is necessary for quiet running, and plays an important part in the overall drive shaft operation.

To this point in the description the axis of articulation has been referred to as generally vertical. It may in fact be truly vertical, but preferably is inclined slightly (typically 3 to 5°, but it could be more if desired, even as high as 10°) forwardly and upwardly, as illustrated on a larger scale in FIGURE 14. The weighting of the frames 10 and 11 tends to make their remote ends heavy. The power plant 15 is situated forward of the axis of the forward axle assembly, and tension in the cable at the rear tends to have a similar outward tilting effect on the rear frame 11. Also the weight of the winch and cable sheaves is remote from the axis of articulation. As a consequence, the portions of the two frames that come together in the centre of the vehicle would normally tend to rise rather than fall, if the interconnecting pins 12 and 13 were removed. With the axis of articulation inclined, as illustrated in FIGURE 14, steering of the vehicle in either direction from straight line travel causes the level of the articulating pins 12 and 13 to fall slightly. These pins follow a path that is not quite horizontal, but is slightly downwardly inclined on each side of the centre (that is the position when the two frames are aligned for straight line travel). The tendency for the portions of the frames joined together by the pins to rise, by reason of the weighting of the ends of the frames remote from the axis of articulation, thus has a self-centering and consequent stabilizing effect on the steering.

The inclination of the axis of articulation is determined by the inclination of the line joining the pins 12 and 13. Whether the pins themselves are turned to lie along such an inclined axis, or whether they remain vertical, is a matter of little consequence, since these pins are both formed with self-aligning, part-spherical bushings 90 similar to the bushings 84 of the pivoting beam 81. This ability for self alignment is desirable to enable the vehicle to be properly steered, regardless of whether the axis of articulation is inclined or not.

I claim:
1. An articulated-type vehicle comprising
  (a) a first frame,
  (b) a second frame,
  (c) a pair of laterally spaced road wheels mounted for rotation about a single axis on an associated axle assembly mounted on said first frame to pivot about a horizontal axis extending along the longitudinal centre of said first frame,
  (d) a pair of laterally spaced road wheels mounted for rotation about a single axis on an associated axle assembly rigidly mounted on said second frame,
  (e) means pivotally connecting said frames together about an axis of articulation contained in a vertical plane along the longitudinal centre of said frame and inclined from the vertical upwardly and towards the first frame,
  (f) means for steering the vehicle by controlling relative pivoting of the frames about said axis of articulation, the inclination of said axis of articulation causing the portions of the frames connected together to drop in level upon steering movement away from a straight line position,
  (g) and means supported by said frames for weighting the ends of said frames remote from said axis of articulation to cause the portions of the frames connected together to tend to rise whereby to obtain a self-centering steering effect.

2. A vehicle according to claim 1, wherein said axis of articulation is inclined to the vertical by an angle from approximately 3° to approximately 10°.

3. An articulated-type vehicle comprising
  (a) a forward frame and a rearward frame mounted on respective pairs of road wheels and pivotally connected together about a generally vertical axis,
  (b) means for steering the vehicle by controlling relative pivoting of said frames about said axis,
  (c) a power plant mounted on said forward frame and an associated drive shaft means extending rearwardly from said power plant along the longitudinal centre line of said forward frame,
  (d) a casing forming part of the forward frame covering the drive shaft means, said casing including
    (i) a horizontal portion over at least a part of said drive shaft means and closely adjacent thereto,
    (ii) a side portion extending downwardly from one side of said horizontal portion adjacent to one side of said drive shaft means,
    (iii) a foot plate extending horizontally from said side portion in a direction away from said drive shaft means,
  (e) a single operator seat mounted on said forward frame and permanently fixed against rotation relative thereto, said operator's seat
    (i) having a seat plane substantially adjacent to the horizontal portion of said casing,
    (ii) being positioned over said drive shaft means and part of said horizontal portion of said casing,
    (iii) extending laterally beyond the side of said side portion opposite said drive means,
    (iiii) and being located so that the upright portion of the body and head of an operator seated thereon is located substantially in a vertical plane along the longitudinal centre line of said forward frame,
    (iiiii) the horizontal direction of said seat forming an acute angle with said vertical plane,
  (f) said foot plate being located below the level of at least part of said drive shaft means and being located with respect to said seat so that a driver may sit squarely and comfortably on said seat and,
    (i) place both feet on said foot plate with both legs comfortably on the side of said side portion remote from said drive shaft means and protected from said drive shaft means by said side portion,
    (ii) view with substantially equal facility both sides of the front end of the forward frame,
    (iii) and twist his body and turn his eyes comfortably to look back along a continuation of said centre line toward the rearward end of the vehicle,
  (g) said seat and foot plate being located with respect to said forward frame and drive shaft means so that a driver seated on said seat with his feet on said foot plate will be as close to the ground as practical while still being seated along the centre line of said forward frame and above said drive shaft means.

4. A vehicle according to claim 3 wherein said angle is of the order of 25°.

5. A vehicle according to claim 3, wherein said seat includes a back rest portion which defines the horizontal direction in which the seat faces.

References Cited by the Examiner

UNITED STATES PATENTS

| 1,945,169 | 1/34 | Walker | 180—77 |
| 2,426,652 | 9/47 | Storey | 180—79.2 X |
| 2,545,139 | 3/51 | Elfes | 280—163 |
| 2,660,454 | 11/53 | Coumerilh | 280—163 |
| 2,756,069 | 7/56 | Manngarn | 280—446 X |
| 2,791,438 | 5/57 | Ruf | 180—77 X |
| 2,827,715 | 3/58 | Wagner. | |
| 3,039,553 | 6/62 | Van Der Lely et al. | 180—77 |
| 3,049,186 | 8/62 | Garrett | 180—51 |

FOREIGN PATENTS

| 51,267 | 11/41 | France. |
| | | (1st. Add. of 861,426) |
| 923,962 | 2/57 | France. |
| 1,148,032 | 6/47 | France. |
| 1,094,029 | 12/60 | Germany. |

A. HARRY LEVY, *Primary Examiner.*

PHILIP ARNOLD, *Examiner.*